United States Patent [19]

Lesley

[11] Patent Number: 4,610,619
[45] Date of Patent: Sep. 9, 1986

[54] PILE FABRIC MOLDING APPARATUS

[75] Inventor: Bascum G. Lesley, Pickens, S.C.

[73] Assignee: Milliken Research Corporation, Spartanburg, S.C.

[21] Appl. No.: 782,039

[22] Filed: Sep. 30, 1985

Related U.S. Application Data

[62] Division of Ser. No. 605,147, Apr. 30, 1984, Pat. No. 4,581,193.

[51] Int. Cl.[4] .................. B29C 43/02; B29C 51/10; B29C 51/36
[52] U.S. Cl. .................................. 425/388; 249/160; 425/394; 425/405 R; 425/406
[58] Field of Search ................ 425/387.1, 388, 405 R, 425/406, 394; 249/160

[56] References Cited

U.S. PATENT DOCUMENTS

| | | | |
|---|---|---|---|
| 1,466,723 | 9/1923 | Izawa | 264/243 |
| 1,471,906 | 10/1923 | Longren | 425/396 |
| 2,939,179 | 6/1960 | Penman et al. | 264/243 |
| 2,969,544 | 1/1961 | Marco et al. | 249/160 |
| 3,007,206 | 11/1961 | Griswold | 264/512 |
| 3,078,516 | 2/1963 | Trammel et al. | 425/394 |
| 3,482,281 | 12/1969 | Thiel | 425/388 |
| 3,523,149 | 8/1970 | Hartmann | 264/510 |
| 4,379,101 | 4/1983 | Smith | 425/387.1 |

Primary Examiner—Willard E. Hoag
Attorney, Agent, or Firm—Earle R. Marden; H. William Petry

[57] ABSTRACT

Pile fabric molding apparatus which incorporates a plurality of pin like members to allow the pile of the fabric being molded to pass therebetween while the pins contact the substrate of the pile fabric to maintain it at a position spaced from the mold member.

1 Claim, 8 Drawing Figures

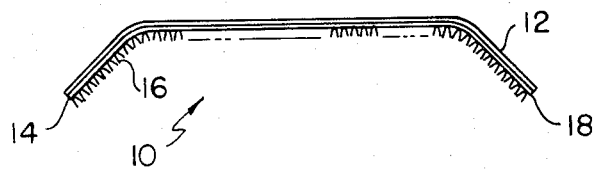
FIG. -1-
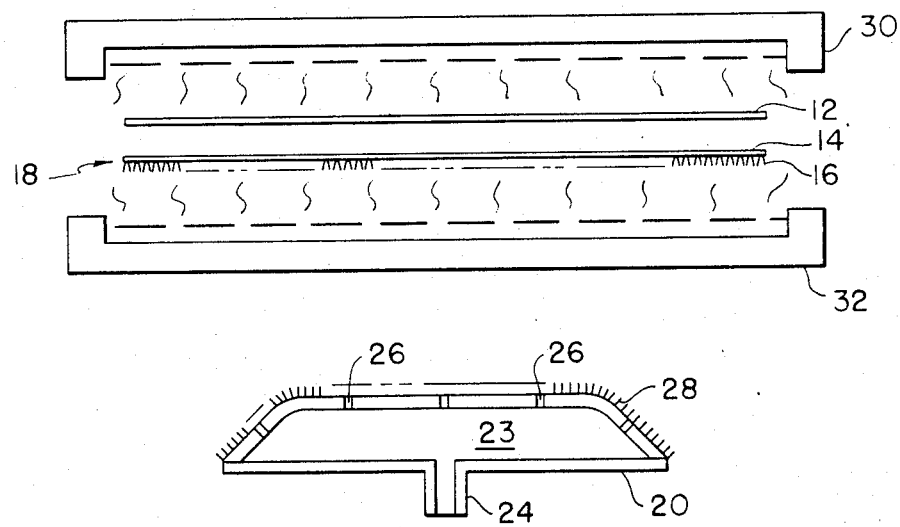
FIG. -2-

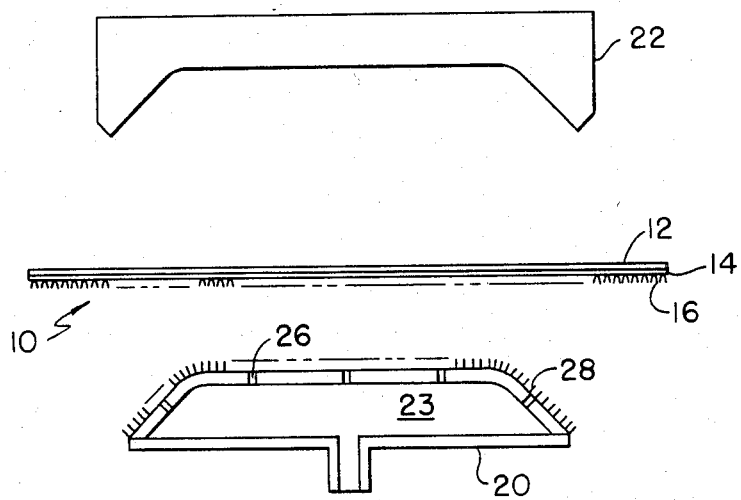
FIG. -3-
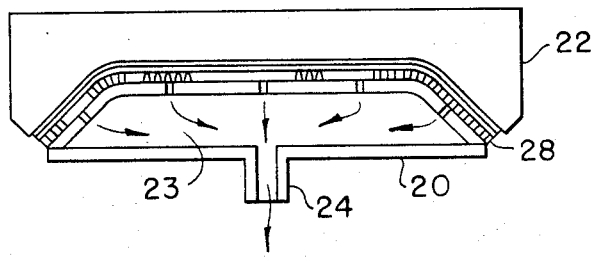
FIG. -4-
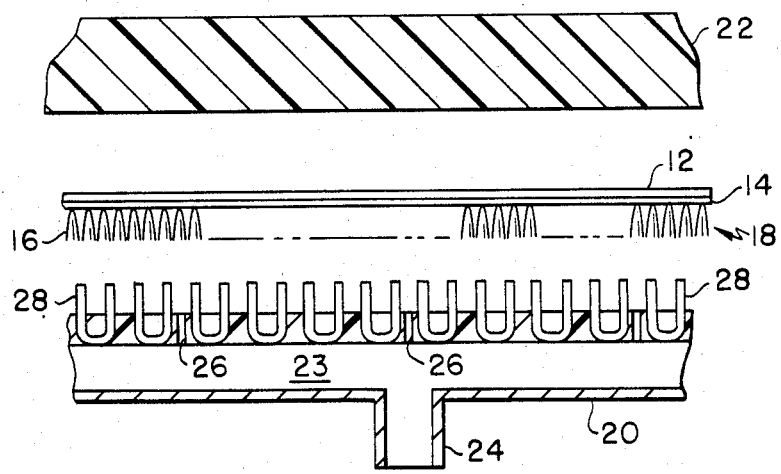
FIG. -5-

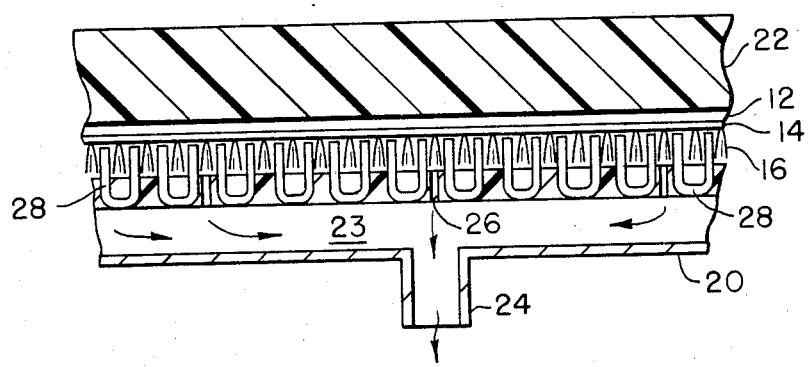
FIG. -6-
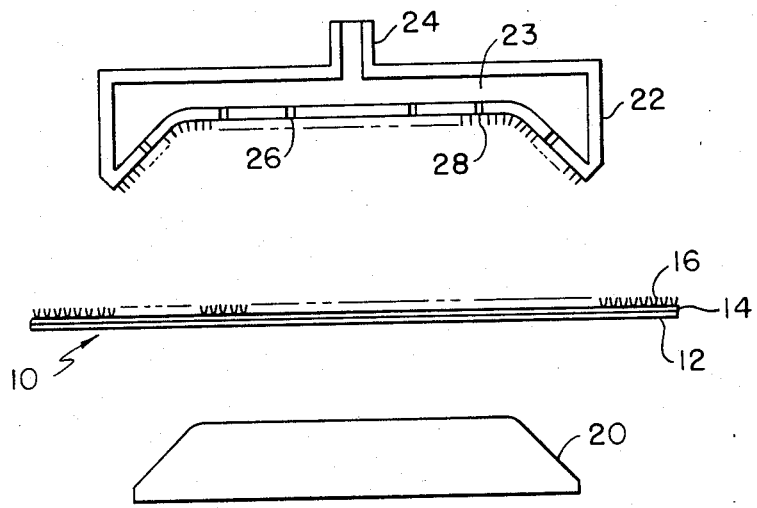
FIG. -7-
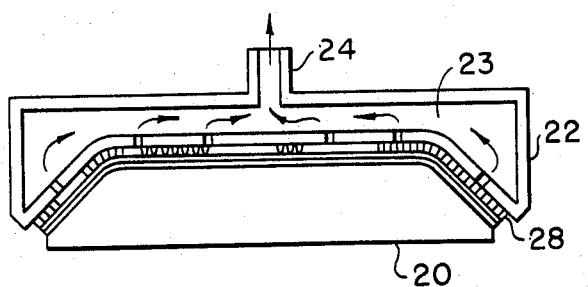
FIG. -8-

PILE FABRIC MOLDING APPARATUS

This is a division of application Ser. No. 605,147 filed Apr. 30, 1984 now U.S. Pat. No. 4,581,193.

In the molding of pile fabrics under heat and pressure the pile of the pile fabric tends to get crushed and upon cooling tends to stay in a mashed down condition. This presents a pile surface which is not very appealing to the eye or comfortable to the touch.

Therefore, it is an object of the invention to provide a method and apparatus which prevents crushing of the pile of a pile fabric during molding thereof.

Other objects and advantages of the invention will become readily apparent as the specification proceeds to describe the invention with reference to the accompanying drawings, in which:

FIG. 1 is a side elevation view of a molded and laminated pile fabric;

FIGS. 2–4 are schematic representations of the steps of molding a pile fabric;

FIG. 5 is a blown-up representation of FIG. 3; and

FIG. 6 is a blown-up representation of FIG. 4.

FIG. 7 shows the mold valves separated and a sheet of pile fabric positioned between them.

FIG. 8 shows the mold halves closed about a sheet of pile fabric.

In recent years the automobile, furniture and other comparable industries have been interested in pre-molding of fabrics, especially pile fabrics, to conform to the shape of the article to be covered, such as automobile seats, dash boards, side panels, seat cushions, etc. In the molding of pile fabrics, the pile of the fabric tended to be crushed when the male and female members of the mold were brought together against the fabric. This fabric, when cooled, tended to maintain the unpleasing crushed appearance on the face of the fabric. To correct this situation the invention disclosed in FIGS. 2–6 will provide a molded pile fabric such as indicated by reference number 10 in FIG. 1, which consists of an airimpermeable substrate material 12, such as a PVC film, laminated to the backing material 14 in which the upstanding pile fibers 16 are secured in. The particular materials of the substrate 14 is not critical so long as it can be molded under heat and pressure and set in the molded condition. Examples of such material would be nylon or polyester. The pile substrate 18 can be wet pile or loop and be woven, knit or tufted.

Looking now to FIGS. 2–6 the formation of the molded pile fabric 10 of FIG. 1 would be explained. The substrate material 12 and the pile substrate 18 are placed in position between the male member 20 and the female member 22 of the mold and held there by any suitable means, not shown. The mold member facing the pile 16 of the pile substrate, which in this case, is the male member 20, is hollow to form a cavity 23 therein and has a conduit 24 in communication with a suction source, not shown. Furthermore, the member has a plurality of orifices 26 in the upper surface thereof and a plurality of pins 28 on the outside of the upper surface for reasons hereinafter explained. Once the pile substrate 18 and the substrate 12 are properly positioned a reciprocating heater is slide into position around the substrates so that platens 30 and 32 will radiate heat thereon. The heat source can be infrared, electric or other suitable heaters so long as it provides suitable energy to efficiently pre-heat the substrates 12 and 18 so that they can be laminated prior to molding. In the preferred form of the invention the amount of heat supplied should be high enough to place the PVC film substrate 12 in a tacky condition so that it will laminate to the back of the pile substrate without the use of an adhesive. Obviously, if desired, an adhesive can be used between the substrates 12 and 14 to provide the fabric 10 as shown in FIG. 3.

Once the substrates have been pre-heated and laminated the heat is slide out of the way and the heated male and female members 20 and 22, respectively, are brought together as shown in FIG. 4 to mold the fabric 10. The fabric 10 is then removed and allowed to cool in order to set the desired shape of the fabric 10.

As shown in detail in FIGS. 5 and 6 the mold members 20 and 22 are brought together as a suction pressure is exerted through the openings 26 in the male member 20 to pull the pre-heated fabric 12 down against the pins 28 so that the fibers 16 will pass between the pins until the pins 28 abut the underside of the substrate 14. This allows the fabric 10 to be shaped to the desired shape without crushing the pile fibers 16.

It is obvious that an apparatus and method has been described which will readily mold a pile fabric without the deleterious effect of crushing the fibers of the pile. This results in a functional molded fabric which retains the luxurious look and feel of a pile fabric.

Although the preferred form of the invention has been described, it is contemplated that changes may be made without departing from the scope or spirit of the invention and I desire to be limited only by the claims.

I claim:

1. A mold for a pile fabric comprising: a female member and a male member having a shape conforming to the shape of the female member, one of said members having as plurality of pins on the surface thereof which faces the other of said members to allow the fibers of a pile fabric located therebetween to pass between the pin members as the male and female members are brought together the member with pins thereon having a cavity therein, a conduit in communication with said cavity and plurality of openings in the surface on which said pins are located and communicating with said cavity so that when a suction pressure is exerted in said cavity through said conduit a pile fabric placed between said members will be sucked downwardly into said pins.

* * * * *